Figure 1:
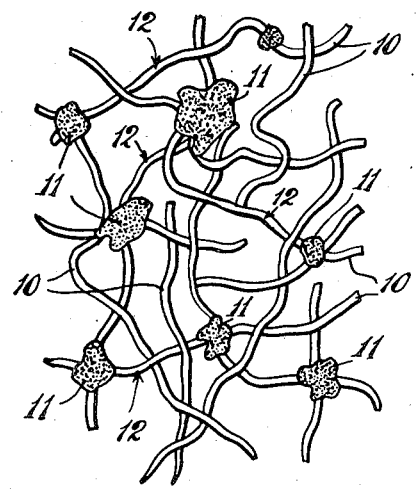

Sept. 25, 1951      C. C. HERITAGE      2,569,169

PRODUCTION OF HOT-BONDED FIBER FELTS

Filed Sept 10, 1942

Inventor
Clark C. Heritage
by W. Bartlett Jones
Attorney

Patented Sept. 25, 1951

2,569,169

UNITED STATES PATENT OFFICE 2,569,169

PRODUCTION OF HOT-BONDED FIBER FELTS

Clark C. Heritage, Cloquet, Minn., assignor to Wood Conversion Company, Cloquet, Minn., a corporation of Delaware Application September 10, 1942, Serial No. 457,830

2 Claims. (Cl. 154—101)

The present invention relates to the formation of a felted fiber structure, such as a loosely felted mat or a rigid board, spot-bonded with a heat-activatable adhesive material. It has particular reference to a felt bonded by a multiplicity of minute localized and spaced bodies of such adhesive, whereby the fibers in regions apart from the adhesive areas are substantially free from such adhesive to impart to the mat desirable properties characteristic of the fibers as they exist apart from the adhesive.

Heretofore it has been proposed to mix dry fibers and finely divided solid particles of adhesive which is thermoplastic or fusible with heat, such as coal tar pitch or asphalt, then to form the mixture while dry into a felted mat, and thereafter to subject the dry felted mat to heat and pressure to fuse the adhesive for binding the fibers together. Such a process is described in Weiss U. S. Patent No. 1,461,337. Modifications are described in Levin U. S. No. 1,970,426, wherein the fibers used may be already coated with a like adhesive substance, and wherein the fibers may be felted to a mat by either a dry or a wet process.

In carrying out the said process of Weiss, it has been found that a high usage of binder is required to secure good strength. It has also been found that the process results in the dry fibers absorbing a great deal of the adhesive, and the dry fibers become coated with adhesive. This absorption of and coating by adhesive prevents that much of the adhesive material from exercising a bonding function, whereby it follows that a high usage of such binder is required. Furthermore, such products wherein the fiber contains or is coated by the adhesive, are undesirable for many uses, because the fibers acquire new characteristics of body and surface, and lose the original or conditioned fiber characteristics of either body or surface, or both, which may be desired in the bonded structure, for given functions, or for general properties of the product.

The object of the present invention is to produce specially heat-bonded structures of fiber and adhesive, which preserve to a high degree certain body or surface characteristics of the fiber, or both, and to secure such bonding with quantities of thermally activated adhesive less than heretofore required.

It is to be understood that the desired thermally produced bond is not necessarily the only bond. For example, a mat bonded with only one binder which is water soluble, is permitted to disintegrate in water. If this carries an extra bond of the character provided by the present invention, such a loss of a water-soluble bond will not permit disintegration of the mat. Therefore, the invention may be carried out with other bonds in addition to the spot bonds effected.

In the present invention the fibers in bonded or unbonded mat-form, containing finely-divided scattered solid bodies of heat-activatable water-insoluble adhesive substantially uniformly distributed throughout the mat, are present as water-moistened fibers while the heat is applied to activate such adhesive, so that the adhesive acts upon moist and not upon dry fibers. The moisture in the fibers prevents absorption of adhesive, and spread of the adhesive to coat fibers, whereby it remains localized. Where the adhesive is heat-plastic, that is subject to alternate softening and setting, the heat is removed to commence cooling and to secure setting of the adhesive before the portions of the fibers in contact with the adhesive are dried to a condition of absorbency for the flowing of melted or fluid adhesive. Where the adhesive is thermoplastic and thermo-setting as in the case with certain synthetic resins, the conditions are such as to secure setting while the contacting portions of the fibers are sufficiently moist to prevent absorption by or coating of the fibers.

In carrying out the invention in its broadest aspect, the fibers need to be moistened before the heat activation step. Thus, for example, the mat formed by the process of said Weiss patent, of dry fibers and solid asphalt particles, may be moistened by use of water, prior to the heat-activation of the asphalt or pitch described therein.

However, in preferred practice the invention is carried out by using moist fibers to form the initial mat. The moisture when present in the fibers used for forming moist mats has three useful functions. Moist fibers are more flexible than dry fibers, and in being felted in a loose condition produce a mat of greater uniformity and with better felting than do dry fibers otherwise under the same conditions. A second function is to preserve the integrity of the fibers in compressing, especially when more dense structures are formed, for example rigid board. The third function relates to the solid adhesive particles. The moist fibers are a better vehicle for holding and fixing the solid particles not only on the fibers in the form of an air-suspension, but also in the felted mat. In handling the loosely felted mat the moist fibers minimize the danger of the solid particles falling away from fibers and sifting through a loosely felted mat. In compressing a loosely felted mat, or in handling the resulting compressed mat, the moist fibers continue to exert this same holding function. Thus, by having initially, moist fibers, and keeping them moist in the felted mat up to the time of activating the adhesive, the original uniformity of dispersion of the adhesive may be more readily maintained.

Where the invention is carried out without using water in producing the original felt, the water may be introduced later at one of several places in the process. Thus, a fibrous material which may require a shredding or like operation to liberate the fibers, may be mixed with lumps of adhesive to be pulverized simultaneously in a suitable mill with such defibering operation as described by Weiss in U. S. No. 1,461,337, to produce a mixture of the fiber and the binder to be felted, and the mixture may be felted dry as further described by Weiss. Before the heat-treatment described by Weiss as effected on the dry mat, the fibers are made suitably moist according to the present invention.

Or, by following the methods described by Levin in U. S. Patent No. 1,970,426, the powdered binder and dry individualized fibers may be suitably mixed to provide a suitable fiber-adhesive mixture to be dry-felted.

When the preferred process of the present invention is used, the water employed in the felting operation to moisten the fibers, may be made a vehicle for introducing some other substance desired in the final product, or for the process, such as dyestuff for coloring, starch for binding and stiffening the fibers, glycerine for flexibilizing the fibers, agents for flame-proofing, agents for mould-proofing, wetting agents, agents for water-proofing, binder to fix the solid particles of adhesive, and many other agents for well known purposes. However, the invention is not thus limited to using the water as a vehicle for such agents, and it is to be understood that the water added elsewhere in the process may be used as a vehicle for a like purpose. By the preferred procedure, however, a more uniform distribution of such agents may be effected.

Thus it will be understood that the invention may be carried out in numerous ways in addition to those specifically illustrated in the following description and explanation.

Fig. 1 is an enlarged illustration of the appearance of the hot-bonded product, showing only some of the fibers, as they are bound by the adhesive after the activation.

Many of the variations of the process will become apparent without the necessity of illustrating specifically all the modified complete procedures which may result from following the various steps described.

The basic material is a fibrous material which may be baled fiber, lapped pulp, straw, grass, bagasse, corn-stalks or the like, capable of yielding by suitable processing, a mass of individualized fibers.

The special binder may be normally solid lumps or other solid forms of adhesive which is activatable to adhesiveness by the action of heat, such as lumps of asphalt, or natural or synthetic resin. A suitable process is employed to reduce the adhesive to a finely divided form.

Additionally there may be used water or a suitable aqueous dispersion, which term includes solutions.

*The preferred process*

By the preferred process the aqueous liquid as a mist or spray, the individualized fibers, and the finely divided adhesive, are introduced into a common volume of air under conditions to produce a well mixed air suspension of the three principal ingredients. These of course are in motion to intermix and form moist fibers with adherent solid adhesive. The mixture is suitably deposited on a receiving base, such as a platform or wire screen, stationary or mobile according to whether the process is batch or continuous, under conditions to produce a substantially uniform felt of moist fibers with adhesive particles spotted uniformly throughout. Well known procedures may be used.

The moist felt thus formed may be somewhat pebbly in surface appearance by processes making very low density felts which have little strength and cohesion, and it also may have high mobility of the fibers on slight disturbance. In such cases the low density felt is compressed to a desired degree by rolls or platens, preferably to produce parallel flat surfaces, giving a uniform caliper to the mat, increasing the felted union, and increasing the strength and durability of the mat for further processing or handling. It is to be understood that such compression may be omitted where the original felt is produced under conditions to give a suitably strong felt.

If desired either the original or compressed mat may be dried, for rolling when it is flexible, or for shipment to some distant point for further processing. Then it may be remoistened to reproduce a felt effective like the moist mat for the succeeding steps of the process. When such drying is practiced, it is desirable to have a binder of some sort present, which is effective in the drying to stick the solid particles of adhesive securely to the fibers, and to bond the fibers, to prevent both sifting out of the felt. Such binder may be present in the aqueous liquid employed, and it may even be introduced in a separate spray of liquid or dispersion of other form when forming the felt.

The moist felt or the remoistened felt is then subjected to heat, or to heat and pressure if further densification is desired. The degree of heat required is dependent upon the character of the solid adhesive used, and preferably it is desired to use an adhesive which permits use of a temperature above 100° C. Thus, the moisture in the felt may be boiled out in a short space of time to yield a dry felt. The time of application of heat is controlled so that with or without cooling, according as the solid adhesive is thermoplastic or heat-setting, the adhesive may be set before the fibers in contact with the adhesive have become "dry" to the point of absorbency or the point of permitting the adhesive to flow to coat the fibers. Moist fibers resist coating and absorption, and conduct of the process to exercise the function of the moist fibers is responsible for securing the character of product desired.

The heat, or heat and pressure, may be applied by known means. Conditions may differ slightly for thermo-setting resins and heat-fusible adhesives. In the former case the setting is effected on moist fibers, and heating may continue undiminished in degree after the setting to dry all the fiber content. In the case of fusible adhesives like asphalt, the heat must effect the adhesive condition, but it must not be continued undiminished until all the fiber content is dry, or else there will be absorption and a tendency to coat, with loss of spot-bonds. The presence of the softened spot-bonds surrounding the moist fibers, protects the covered portions of the fibers from drying, while the inter-spot-bond fiber portions may dry. The heat should be diminished to set the adhesive while the bond-covered portions remain moist. In the meantime, the rest of the fiber may have dried wholly or completely. After setting the adhesive, drying action may be continued if desired. If the product as a whole appears substantially dry, the higher residual moisture in the fiber portions under the adhesive will decrease to a condition of equilibrium with the unbonded portions of the fibers.

The action is expressed generically by the term "setting adhesive over moist fiber portions" regardless of the moist or dry condition of the remaining portions of the fibers.

The appearance of the dry hot-bonded felt under the microscope is represented in Fig. 1, later described.

Modifications

The dry fibrous material and the solid binder may be simultaneously disintegrated in a shredder or like machine. Or the individualized fibers and the powdered binder may be uniformly mixed. The product from the shredder or from the mixer may be introduced simultaneously with aqueous liquid into an air suspension device.

A dry process may be used for the original felting. For it, there may be used the product from the shredder, or the product from the mixer, or the powdered binder and the individualized fibers may enter such device separately. This dry felting may be accomplished while omitting the liquid, or by a pneumatic process inducing felting by impact. The original felt may be dry compressed, if desired, and then be moistened by aqueous liquid. Another method is to moisten the original dry felt by liquid, whereby it becomes comparable to the said loose felted moist mat. The dry mat may be simultaneously compressed and moistened.

Fig. 1 is typical of the appearance of any product of the invention. Fibers 10 lie in heterogeneous directions in felted or entangled relation. The fibers 10 illustrated are those drawn to picturize the field of vision in a binocular microscope. They show clearly localized spot bonds 11, and the surfaces 12 of the fiber between bonds as free from any coating by said spot-bond adhesive. Actually, the drawing of Fig. 1 was made from examining the product produced by Example 5. Specimens of mats made by hot bonding on dry fibers have been similarly examined and where they do show spot bonds, they are of diminished size and there is coating of the fibers extending from the bond spots over the fibers running from the bonds. Where there are no spot bonds there are merely coated or impregnated fibers.

The finely divided solid adhesive may be selected from many available materials, some being brittle when cold, others being tough when cold. Plasticizers may be compounded with them, or suitably introduced in the process, to alter the properties of a particular adhesive substance. Both natural and synthetic adhesives are available, such as the various rosins and their derivatives, asphalt, pitch, ozokerite, gilsonite, shellac, coal tar resins, petroleum resins, cellulose derivatives, such as ethyl cellulose and compounds of it with resins. Some of the petroleum resins are air-drying, but also have the property of fusing and setting, and will air-dry later in the set condition. Driers may be used with them in the present invention to speed this phase of the completions of the binder.

In the water introduced there may be materials to size or to alter the qualities of the fiber, to alter its wettability or water-resistance, to flexibilize it, or to stiffen it, or to bind fiber to fiber by one kind of bond different from the hot-bond, or to bind the hot-bond particles temporarily to the fiber prior to the hot bonding. Available substances are starch, casein, and other proteins, water-dispersible gums, glycerol, wetting agents, emulsified wax, latex emulsions, water-soluble synthetic resins, alkali to change the pH of fibers, ammonium sulphate or phosphate to flame-proof, germicides, insecticides, and other things which do not alter the essential functions between the water, the fiber and the solid adhesive particles. Where water without additions to it is used, it is not very important how fine is the mist of the spray. However, where additions to it are made, it is desirable to have a fine spray and one which is controlled. The number and size of mist particles per unit area of fiber available to receive the spray, determines the extent of uniform dispersion of the added agents onto the fibers. Each mist particle landing on a fiber, deposits its contents close to the point of contact, then the moisture spreads through the fiber to equilibrium.

In carrying out the invention batchwise, the air suspension may be made in a chamber and the suspended mixture deposited from the air by gravity, suction or pressure, in various ways. In the case of gravity the density of formation tends to be least, and the receiving base may be perforate or imperforate, solid, flexible or otherwise. A sheet of fabric may be used on which the low density mat may be carried and removed without disrupting its structure.

In carrying out the process continuously, the receiving base above referred to may be a moving conveyer slowly passing through the chamber, and leaving the chamber when sufficient fiber has been deposited, all in a well known manner. The desired compressions may be effected with rolls or other means, and the mat either dried, or not dried, before the final heat activation with an adequate moisture content in the fibers.

The amount of water present in the felting process, may vary over a considerable range while permitting the desired original felting. In the case of wood and like cellulosic fibers, one part of dry fiber may be felted readily with from 1 to 4 parts of water. More water than 4 parts gives an acceptable result, but increase tends to produce a soggy mat. The presence of material in the water, such as starch, proteins or gums, which thicken the water, permits more water to be used with advantage over a like amount of water lacking such agents. The use of water below said 1 part also gives acceptable results, and a felt may be formed using no water.

However, the stage where the presence of water is important is in the hot bonding. Air-dry vegetable fibers usually contain 10% by weight of moisture and exhibit absorbency for fused or thermoplastic adhesives. However this 10% content is not free water which latter makes fibers "moist" in the true sense. Fibers containing 50% of water by weight are appreciably moist, and successfully resist absorbing the various fused and thermoplastic binders when in a press sufficiently heated by steam, and when the heat is removed and cooling permitted to set the hot-binder, while the covered portions of the fibers are still moist. The critical point for moisture content obviously lies well above 10% and well below 50% moisture content by weight, and will vary greatly with the kind of fiber, the kind of hot-bond adhesive, the temperature, and upon the presence of material such as starch, protein and the like associated with the fiber.

The following examples illustrate the invention.

*Example 1*

Wood fibers produced by suitable devices acting upon wood, are fed into a chamber in dry state by a blower which effects an air dispersion. Powdered asphalt (M. P. 302° F. by ball and ring) of which 95% passes through a 100 mesh screen, is introduced into the same blower for simultaneous dispersion into the chamber, at the bottom of which the material is gathered into a felt. Water is also sprayed into the chamber to enter the mixture of fiber and asphalt in the ratio of 3.8 parts of water to 1 part of dry fiber. This mixture settles by gravity onto a receiving base forming a felt. The felt is thus formed of moistened fibers to which the asphalt particles adhere. The felt has an initial fiber density of 0.75 lb. per cu. ft. and appears somewhat pebbly at the surface. At such density it has little mechanical strength, whereby upon compression between rolls or plates it is altered with rearrangement of fibers to form a more uniform and denser felt having uniform caliper. Such compression is effected on the moist felt to a fiber density of 1.5 lbs. per cu. ft., at which it has an appreciable mechanical strength, which increases with increasing density.

The moist sheet is then conducted to a heated platen press where heat is applied with or without compacting pressure. This heats the moist blanket or felt. The asphalt used becomes adhesive at about 300° F., whereby the plates may be heated to boil moisture out of the mat. With pressure during the heating process the mat has been brought to a density upwardly from 1.5 to 10 lbs. per cu. ft. and higher, whereby it varies in quality from a flexible blanket to a rigid board.

In the activation process the temperature applied may be greater than the fusion point of the asphalt, and the mat may appear dry. However it must not be continued after the mat has such appearance of being dry, because the residual moisture inside the fibers within the spot-bonds will diffuse out, and absorption and spreading of the bond will result. The mat may be removed from the press while still moist, but if it is retained in the press with the binder in fused condition after the mat has become thoroughly dry, the advantage of the invention will be lost.

*Example 2*

Fiber in dry condition is blown together with powdered bitumen (M. P. 300° F.) into a settling chamber. Water containing an alkyl sulfonate salt as wetting agent is sprayed into the mixture. The proportions of materials are:

| | Parts by weight |
|---|---|
| Dry fiber | 100 |
| Bitumen (70 mesh) | 12.5 |
| Water | 100 |
| Wetting agent | 0.5 |

This is formed into a felt of about 0.4 lb. per cu. ft. fiber density (about 6 inches thick) on a sheet of cotton scrim. Onto the moist felt is placed a second sheet of cotton scrim. The felt is then compressed by rolls between the scrim sheets to a fiber density of 5 lbs. per cu. ft. (about ½ inch thick). The moist sheet can then be rolled and if desired shipped to a distant point for further treatment. If desired, the sheet can be dried before rolling, and remoistened after shipping and before the heat treatment.

To heat-treat the moist sheet, it is placed in a platen press with plates heated by 50 lbs. steam pressure, and with mechanical pressure to reduce the mat to 0.1 inch thickness and to a density of 25 lbs. per cu. ft. The heat and pressure treatment lasts for 5 minutes, during which time water is boiled out as steam, while the bond particles become heated and fuse in situ on the still moist portions of the fibers.

As discussed in Example 1, the mat is retained in the press until it becomes seemingly dry, but not long after this point. When removed, the moisture in the fiber parts within the bond comes to equilibrium with the moisture, if any, in the remaining portions of the fibers. This is considered as a "drying" step for the purpose of defining the invention in the claims.

*Example 3*

The foregoing process of Example 2 is repeated using in the water spray a water-soluble phenolaldehyde resin in quantity of 10 parts by weight to 100 parts of dry fiber. A fine mist is sprayed into the fiber-bitumen mixture. The fibers become spotted with resin, to serve as a binder to hold the bitumen particles to the fiber. The mat as first compressed after formation is dried for shipment, with little danger of the bitumen particles sifting out of the mat or shifting within it to alter the original distribution. The drying is effected by passing the blanket through a chamber heated to 260° F. The dry mat at the locale of bonding by heat, is moistened, and the moist mat is heated to effect the bond. Without such moistening the fine particles of bitumen do not effect a bitumen bond.

*Example 4*

Dry wood fiber and thermo-setting resin powder are blown into a felt-forming chamber and a water spray is simultaneously introduced. The ratio of materials is as follows:

| | Parts by weight |
|---|---|
| Wood fiber | 100 |
| Phenol-aldehyde moulding resin powder | 20 |
| Water | 300 |

A moist felt is formed and then compressed to a fiber density of 2 to 3 lbs. per cu. ft. The moist sheet is placed in a platen press with plates heated by steam at 50 to 75 lbs. pressure, more or less, depending on the resin employed, and mechanical pressure is applied to increase the density anywhere up to about 60 lbs. per cu. ft.

The resin goes through a plastic stage in situ on the moist fibers and then sets. The time in the press may be continued until and after the sheet is entirely dry.

*Example 5*

Dispersed dry wood fiber, and a 10% dispersion in water of a finely powdered petroleum drying resin (Velsicol FE-9 made by Velsicol Corporation, Chicago, Ill.) are mixed in air, and deposited in the form of a low density blanket as above described, using materials as follows:

| | Parts by weight |
|---|---|
| Dry wood fiber | 100 |
| Velsicol | 30 |
| Water | 270 |

The mat was compressed while moist to a lower fiber density of about 2 to 3 lbs. per cu. ft. Then it was hot pressed for 15 minutes in a press with platens at 300° F., giving a final thickness of 1.03 inches and density of 8.8 lbs. per cu. ft.

The foregoing examples are given by way of illustrating the invention and are not intended to limit it short of its spirit and scope as set forth in the appended claims.

I claim:

1. The method of forming a bonded felted fiber structure which comprises forming a substantially uniform mixture in suspension in air which mixture comprises substantially individualized fiber, finely divided solid heat-activatable water-insoluble adhesive material and a finely divided mist of aqueous material in quantity to moisten the fiber, the said adhesive material being such as to require a temperature above 100° C. to activate it to adhesiveness, and the aqueous liquid containing a binder capable of drying at a temperature under the above mentioned required temperature for binding the said particles of adhesive to the fibers, depositing said mixture from suspension in air upon a receiving base in the form of a loosely felted fiber mat, the components of said mixture in the production of the mixture and in the course of being deposited as a mat so combining as to form moist fibers with adhering particles of said adhesive, compressing the moist mat to a desired fiber-density greater than the fiber-density of said originally felted mat while producing a sheet-like form of uniform caliper, drying the resulting sheet-like form at a temperature below the activating temperature for the adhesive particles whereby the said binder secures the particles to the fiber, then moistening the said sheet-like form, subjecting the moist sheet-like form to heat while activating the particles of adhesive and while uniting fibers having moist portions which portions are in contact with the adhesive particles, setting the adhesive while there is moisture in the fiber portions in contact with the adhesive, and finally drying the entire fiber content including the said fiber portions.

2. The method of forming a bonded felted fiber structure which comprises forming a substantially uniform mixture in suspension in air which mixture comprises substantially individualized fiber, finely divided solid heat-activatable water-insoluble adhesive material and a finely divided mist of aqueous material in quantity to moisten the fibers, the said adhesive material being such as to require a temperature above 100° C. to activate it to adhesiveness, and the aqueous liquid containing a binder capable of drying at a temperature under the above mentioned required temperature for binding the said particles of adhesive to the fibers, depositing said mixture from suspension in air upon a receiving base in the form of a loosely felted fiber mat, the components of said mixture in the production of the mixture and in the course of being deposited as a mat so combining as to form moist fibers with adhering particles of said adhesive, compressing the moist mat to a desired fiber-density greater than the fiber-density of said originally felted mat while producing a sheet-like form of uniform caliper, drying the resulting sheet-like form at a temperature below the activating temperature for the adhesive particles whereby the said binder secures the particles of the fiber, then moistening the said sheet-like form, subjecting the moist sheet-like form to heat and compacting pressure while activating the particles of adhesive and while uniting fibers having moist portions which portions are in contact with the adhesive particles, setting the adhesive while there is moisture in the fiber portions in contact with the adhesive, and finally drying the entire fiber content including the said fiber portions.

CLARK C. HERITAGE.

REFERENCES CITED

The following references are of record in the file of this patent:

UNITED STATES PATENTS

| Number | Name | Date |
|---|---|---|
| 1,336,402 | Weiss | Apr. 6, 1920 |
| 1,461,337 | Weiss | July 10, 1923 |
| 1,905,225 | Hawerlander | Apr. 25, 1933 |
| 2,047,170 | Asplund | July 14, 1936 |
| 2,057,167 | Sherman | Oct. 13, 1936 |
| 2,249,888 | Dodge | July 22, 1941 |
| 2,252,157 | Bergin | Aug. 12, 1941 |
| 2,288,095 | Lindsay | June 30, 1942 |